(12) United States Patent
Song et al.

(10) Patent No.: US 11,822,179 B2
(45) Date of Patent: Nov. 21, 2023

(54) TOUCH SENSOR PANEL AND OPTICAL LAMINATE

(71) Applicants: Sumitomo Chemical Company, Limited, Tokyo (JP); Dongwoo Fine-Chem Co., Ltd., Pyeongtaek-si (KR)

(72) Inventors: Byunghoon Song, Pyeongtaek-si (KR); Wonkyu Jung, Pyeongtaek-si (KR)

(73) Assignees: SUMITOMO CHEMICAL COMPANY, LIMITED, Tokyo (JP); DONGWOO FINE-CHEM CO., LTD., Gyeonggi-Do (KR)

(*) Notice: Subject to any disclaimer, the term of this patent is extended or adjusted under 35 U.S.C. 154(b) by 642 days.

(21) Appl. No.: 16/853,037

(22) Filed: Apr. 20, 2020

(65) Prior Publication Data
US 2020/0333661 A1  Oct. 22, 2020

(30) Foreign Application Priority Data
Apr. 22, 2019 (JP) ................................. 2019-081086

(51) Int. Cl.
*G02F 1/1335* (2006.01)
*G02B 5/30* (2006.01)
(Continued)

(52) U.S. Cl.
CPC ..... *G02F 1/133528* (2013.01); *G02B 5/3016* (2013.01); *G02F 1/13338* (2013.01);
(Continued)

(58) Field of Classification Search
None
See application file for complete search history.

(56) References Cited

U.S. PATENT DOCUMENTS

| 2014/0036170 A1* | 2/2014 | Nashiki | ..................... G06F 3/03 349/12 |
| 2016/0202810 A1* | 7/2016 | Ito | .......................... B32B 15/08 345/174 |

(Continued)

FOREIGN PATENT DOCUMENTS

| JP | 2013-33249 A | 2/2013 |
| JP | 2013-37353 A | 2/2013 |

(Continued)

OTHER PUBLICATIONS

Office Action dated Jan. 10, 2023 in JP Application No. 2019-081086.
(Continued)

*Primary Examiner* — Eli D. Strah
(74) *Attorney, Agent, or Firm* — Panitch Schwarze Belisario & Nadel LLP

(57) ABSTRACT

A touch sensor panel includes a base layer, a touch sensor layer, and a first insulating layer in this order. The touch sensor layer includes a patterned conductive layer. A water vapor transmission rate Pc of the base layer at a temperature of 40° C. and a humidity of 90% RH is not higher than 900 g/(m²•24 hr). A water vapor transmission rate Pa of the first insulating layer at a temperature of 40° C. and a humidity of 90% RH is not higher than 900 g/(m²•24 hr).

8 Claims, 3 Drawing Sheets

(51) Int. Cl.
*G02F 1/1333* (2006.01)
*B32B 7/12* (2006.01)

(52) U.S. Cl.
CPC .......... *G02F 1/133308* (2013.01); *B32B 7/12* (2013.01); *B32B 2307/202* (2013.01); *B32B 2307/206* (2013.01); *B32B 2307/724* (2013.01); *B32B 2307/7242* (2013.01); *B32B 2307/7246* (2013.01); *B32B 2457/04* (2013.01); *B32B 2457/20* (2013.01); *B32B 2457/202* (2013.01); *B32B 2457/206* (2013.01); *B32B 2457/208* (2013.01); *C09K 2323/03* (2020.08); *C09K 2323/031* (2020.08); *C09K 2323/04* (2020.08); *C09K 2323/05* (2020.08); *C09K 2323/06* (2020.08); *G02F 1/133311* (2021.01)

(56) References Cited

U.S. PATENT DOCUMENTS

| | | |
|---|---|---|
| 2017/0123124 A1 | 5/2017 | Hatanaka et al. |
| 2018/0166507 A1 | 6/2018 | Hwang et al. |
| 2019/0113791 A1 | 4/2019 | Yamamoto et al. |

FOREIGN PATENT DOCUMENTS

| | | | | |
|---|---|---|---|---|
| JP | 2016-14877 A | | 1/2016 | |
| JP | 2017-83843 A | | 5/2017 | |
| JP | 2017111567 A | | 6/2017 | |
| JP | 2018-031940 A | | 3/2018 | |
| JP | 2018097869 A | | 6/2018 | |
| JP | 2018116543 A | | 7/2018 | |
| JP | 2018185811 A | | 11/2018 | |
| JP | 2019035801 A | | 3/2019 | |
| KR | 10-2015-0060536 A | | 6/2015 | |
| KR | 2017069123 A | * | 6/2017 | ............. G06F 3/041 |
| KR | 2018097337 A | * | 8/2018 | ............. B32B 27/18 |
| WO | 2013084872 A1 | | 6/2013 | |
| WO | 2017138611 A1 | | 8/2017 | |

OTHER PUBLICATIONS

1 Office Action dated Jun. 13, 2023 in JP Application No. 2019-081086.
Office Action dated Oct. 3, 2023 in JP Application No. 2019-081086.

* cited by examiner

TOUCH SENSOR PANEL AND OPTICAL LAMINATE

CROSS-REFERENCE TO RELATED APPLICATIONS

This application claims priority under 35 U.S.C. § 119(b) to Japanese Application No. 2019-081086 filed Apr. 22, 2019, the disclosure of which is incorporated herein by reference in its entirety.

BACKGROUND OF THE INVENTION

Field of the Invention

The present invention relates to a touch sensor panel and an optical laminate including a touch sensor panel.

Description of the Background Art

It has been known that a touch sensor panel is used as being incorporated in an image display device such as a liquid crystal display device and an organic electroluminescence (EL) display device (for example, Korean Patent Publication No. 10-2015-0060536). In the image display device incorporating the touch sensor panel, a user can input information by operating an image of an input button or an icon shown on a display screen. Such an image display device is used also in a small-sized portable terminal such as a smartphone, a portable game console, an audio player, a tablet terminal, or a car navigation device.

SUMMARY OF THE INVENTION

The image display device has recently been used in various environments owing to its high applicability. Therefore, the image display device or various components incorporated in the image display device have been required to be durable, for example, in a severe environment such as an environment high in temperature and humidity.

An object of the present invention is to provide a touch sensor panel capable of achieving suppressed occurrence of poor drive even when it is exposed to a high-temperature and high-humidity environment and an optical laminate including the same.

The present invention provides a touch sensor panel and an optical laminate below.

[1] A touch sensor panel includes a base layer, a touch sensor layer, and a first insulating layer in this order, the touch sensor layer includes a patterned conductive layer, a water vapor transmission rate Pc of the base layer at a temperature of 40° C. and a humidity of 90% RH is not higher than 900 g/(m²•24 hr), and a water vapor transmission rate Pa of the first insulating layer at a temperature of 40° C. and a humidity of 90% RH is not higher than 900 g/(m²•24 hr).

[2] The touch sensor panel described in [1], in which relation in an expression (1) below is satisfied $$Tc/(Dc+Da)>0.03 \quad (1)$$

where Dc [μm] represents a thickness of the base layer, Tc [mJ/mm³] represents toughness of the base layer, and Da [μm] represents a thickness of the first insulating layer.

[3] The touch sensor panel described in [1] or [2], in which the patterned conductive layer includes a first conductive layer and a second conductive layer sequentially from a side of the base layer, and the touch sensor layer further includes a second insulating layer between the first conductive layer and the second conductive layer.

[4] The touch sensor panel described in any of [1] to [3], in which the base layer includes a support layer, a first bonding layer, and a substrate layer sequentially from a side of the touch sensor layer.

[5] The touch sensor panel described in [4], in which the support layer includes a separation layer.

[6] The touch sensor panel described in [5], in which the support layer further includes a protective layer on a touch sensor layer side of the separation layer.

[7] The touch sensor panel described in [5] or [6], in which the support layer further includes a refraction index adjustment layer.

[8] An optical laminate includes a front plate, a circular polarization plate, and the touch sensor panel described in any of [1] to [7].

[9] The optical laminate described in [8] includes the front plate, a second bonding layer, the circular polarization plate, a third bonding layer, and the touch sensor panel in this order.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
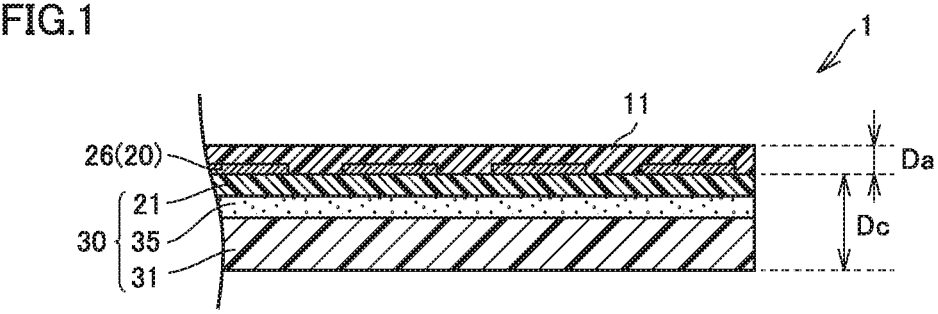
FIG. 1 is a cross-sectional view schematically showing an exemplary touch sensor panel according to the present invention.

Though an embodiment of the present invention will be described below with reference to the drawings, the present invention is not limited to the embodiment below. In all drawings below, each component is scaled as appropriate for better understanding thereof, and the scale of each component shown in the drawings and the actual scale of the component do not necessarily match with each other.

<Touch Sensor Panel>

FIG. 1 is a cross-sectional view schematically showing an exemplary touch sensor panel (which may be referred to as a "TS panel" below) in the present embodiment. So long as TS panel 1 is capable of detecting a touch position, a method of detection is not limited, and exemplary TS panels include a resistive film type TS panel and a capacitance coupling type TS panel.

TS panel 1 shown in FIG. 1 includes a base layer 30, a touch sensor layer (which may be referred to as a "TS layer" below) 20, and a first insulating layer 1 in this order. Base layer 30 includes a support layer 21, a first bonding layer 35, and a substrate layer 31 sequentially from a side of TS layer 20 as shown in FIG. 1. On base layer 30, for example, as shown in FIG. 1, a patterned conductive layer 26 of TS layer 20 can directly be provided on a surface of base layer 30. Substrate layer 31 and first bonding layer 35 are normally provided as being in direct contact with each other. First bonding layer 35 and support layer 21 are normally provided as being in direct contact with each other.

Figure 2:
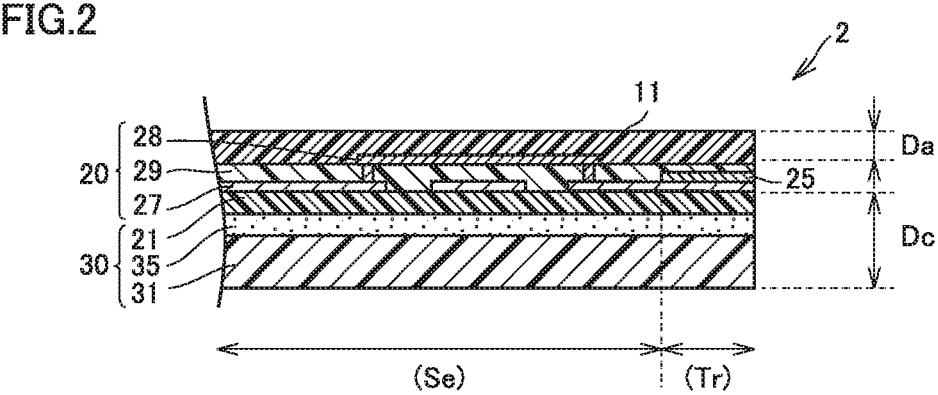
FIG. 2 is a cross-sectional view schematically showing another exemplary touch sensor panel according to the present invention.

TS layer 20 includes at least a conductive layer which will serve as an electrode or an interconnection of TS panel 1, and the conductive layer is a patterned conductive layer formed in a pattern. In TS panel 1 shown in FIG. 1, TS layer 20 is patterned conductive layer 26. As shown in FIG. 2 which will be described later, when a TS panel includes two or more conductive layers in a direction of lamination thereof, TS layer 20 includes all of these conductive layers, and includes also an insulating layer located between conductive layers arranged at a distance in the direction of lamination and a via that electrically connects the conductive layers to each other. In the insulating layer in a space between individual conductive portions included in the conductive layer (conductive portions at a distance in a direction orthogonal to the direction of lamination (which may be referred to as "plane direction" below)), a portion integrally provided such that a boundary with the insulating layer located between the conductive layers arranged at a distance in the direction of lamination is undistinguishable is included in TS layer 20. On the other hand, in the insulating layer in the space between the conductive portions at a distance in the plane direction, a portion integrally provided such that a boundary with base layer 30 or first insulating layer 11 is undistinguishable is included in base layer 30 or first insulating layer 11.

First insulating layer 11 is normally provided to cover at least a surface of TS layer 20 opposite to base layer 30. First insulating layer 11 may cover a side surface of TS layer 20 that extends along the direction of lamination. A surface of first insulating layer 11 opposite to TS layer 20 (patterned conductive layer 26 in FIG. 1) can be formed as being flat rather than being in a shape in conformity with a height difference attributed to patterned conductive layer 26. First insulating layer 11 can be provided also in a space between conductive portions at a distance from each other in the plane direction of patterned conductive layer 26 as shown, for example, in FIG. 1. Thus, in the insulating layer provided in the space, a portion integrally provided such that the boundary with first insulating layer 11 that covers the surface of patterned conductive layer 26 opposite to base layer 30 is undistinguishable is included in first insulating layer 11. On the other hand, in the insulating layer provided in the space between the conductive portions at a distance from each other in the plane direction of patterned conductive layer 26, a portion not integrally provided but distinguished from the boundary with first insulating layer 11 that covers the surface of patterned conductive layer 26 opposite to base layer 30 is not included in first insulating layer 11. As described above, when the conductive layer includes a plurality of layers arranged at a distance from each other in the direction of lamination (for example, in an example of the TS panel shown in FIG. 2 which will be described later), first insulating layer 11 is provided to cover at least the surface of TS layer 20 opposite to base layer 30, and more specifically, provided to cover at least the surface of the conductive layer farthest from base layer 30 that is located opposite to base layer 30.

Water vapor transmission rate Pc of base layer 30 at a temperature of 40° C. and a humidity of 90% RH is not higher than 900 g/(m²•24 hr) and water vapor transmission rate Pa of first insulating layer 1 at a temperature of 40° C. and a humidity of 90% RH is not higher than 900 g/(m²•24 hr). Water vapor transmission rates Pc and Pa can be measured by a method described in Example.

Water vapor transmission rate Pc of base layer 30 is preferably not higher than 500 g/(m²•24 hr), more preferably not higher than 300 g/(m²•24 hr), and further preferably not higher than 200 g/(m²•24 hr), and may be not higher than 100 g/(m²•24 hr) or not higher than 50 g/(m²•24 hr). Water vapor transmission rate Pc of base layer 30 may exceed 0 g/(m²•24 hr).

Water vapor transmission rate Pa of first insulating layer 11 is preferably not higher than 800 g/(m²•24 hr), more preferably not higher than 700 g/(m²•24 hr), and further preferably not higher than 600 g/(m²•24 hr), and may be not higher than 500 g/(m²•24 hr). Water vapor transmission rate Pa of first insulating layer 11 may be not lower than 100 g/(m²•24 hr).

Patterned conductive layer 26 included in TS layer 20 is often formed of a material containing a metal alone or metal oxide, and tends to be affected by moisture. TS panel 1 in the present embodiment includes base layer 30 having water vapor transmission rate Pc within the range above and first insulating layer 11 having water vapor transmission rate Pa within the range above. Therefore, when TS panel 1 is exposed to a high-temperature and high-humidity environment, influence by moisture onto patterned conductive layer 26 can be lessened. Occurrence of poor drive such as failure in accurate recognition of a touch position can thus be suppressed.

Patterned conductive layer 26 of TS panel 1 is normally formed as not being readily visually recognizable. When TS panel 1 contains moisture, an index of refraction is varied and patterned conductive layer 26 may visually be recognized. TS panel 1 in the present embodiment includes base layer 30 having water vapor transmission rate Pc within the range above and first insulating layer 11 having water vapor transmission rate Pa within the range above. Therefore, in exposure of TS panel 1 to the high-temperature and high-humidity environment, in addition to suppression of occurrence of poor drive, suppression of variation in index of refraction can be achieved by decrease in moisture that enters TS panel 1. Poor visibility such as visual recognition of patterned conductive layer 26 can thus be suppressed.

A total Pc+Pa of water vapor transmission rate Pc of base layer 30 and water vapor transmission rate Pa of first insulating layer 11 is preferably not higher than 900 g/(m²•24 hr), more preferably not higher than 800 g/(m²•24 hr), and further preferably not higher than 650 g/(m²•24 hr). As a value of the total Pc+Pa is smaller, occurrence of poor drive is more readily suppressed and poor visibility is more readily suppressed. The total Pc+Pa of water vapor transmission rate Pc of base layer 30 and water vapor transmission rate Pa of first insulating layer 11 may be not lower than 100 g/(m²·24 hr).

TS panel 1 preferably satisfies relation in an expression (1) below $$Tc/(Dc+Da)>0.03 \tag{1}$$

where Dc [μm] represents a thickness of base layer 30, Tc [mJ/mm³] represents toughness of base layer 30, and Da [μm] represents a thickness of first insulating layer 11.

Toughness can be measured by a method described in Example.

Thickness Da of first insulating layer 11 refers to a maximum thickness of first insulating layer 11. Therefore, when first insulating layer 11 is provided also in a space between conductive portions at a distance in the plane direction of patterned conductive layer 26, thickness Da refers to a distance from a surface of first insulating layer 11 opposite to base layer 30 to a surface of first insulating layer 11 on the side of base layer 30 (in FIG. 1, the surface of patterned conductive layer 26 on the side of base layer 30) that is located in the space between the conductive portions at a distance in the plane direction, as shown in FIG. 1.

Thickness Dc of base layer 30 refers to a maximum thickness of base layer 30. Therefore, when base layer 30 includes substrate layer 31, first bonding layer 35, and support layer 21, there is a boundary between the insulating layer in the space between the conductive portions at a distance in the plane direction of patterned conductive layer 26 and a layer in base layer 30 located closest to TS layer 20, and these layers are not integrally formed, thickness Dc refers to a total thickness of substrate layer 31, first bonding layer 35, and support layer 21 as shown in FIG. 1. When the layer in base layer 30 located closest to TS layer 20 is located within the space between the conductive portions at a distance in the plane direction of patterned conductive layer 26, thickness Dc refers to a distance from the surface of base layer 30 opposite to TS layer 20 to the surface on the side of first insulating layer 11, of base layer 30 located in the space between the conductive portions at a distance in the plane direction.

Tc/(Dc+Da) (left side) in the expression (1) is preferably not lower than 0.04, more preferably not lower than 0.05, and further preferably not lower than 0.07, and may be not lower than 0.1, not lower than 0.12, or not lower than 0.15. Tc/(Dc+Da) (left side) in the expression (1) is preferably not higher than 1 and may be not higher than 0.8 or not higher than 0.5.

TS panel 1 that satisfies relation in the expression (1) can have good bendability. TS panel 1 may be used as being incorporated in an image display device. As TS panel 1 has bendability, it can be applied to an image display device that can be folded or wound (flexible display).

Thickness Dc of base layer 30 can be, for example, not smaller than 2 μm and may be not smaller than 10 μm or not smaller than 20 μm, and it is normally not larger than 50 μm and may be not larger than 40 μm or not larger than 30 μm. As base layer 30 has smaller thickness Dc, bendability of TS panel 1 tends to be improved, and as base layer 30 has larger thickness Dc, water vapor transmission rate Pc of base layer 30 can be lower.

Toughness Tc of base layer 30 can be not lower than 0.1 mJ/mm³ and may be not lower than 0.5 mJ/mm³ or not lower than 1 mJ/mm³, and it is normally not higher than 200 mJ/mm³ and may be not higher than 100 mJ/mm³. As toughness Tc of base layer 30 is higher, bendability of TS panel 1 tends to be improved.

Thickness Da of first insulating layer 11 can be, for example, not smaller than 0.5 μm, is preferably not smaller than 1 μm and more preferably not smaller than 1.5 μm, and may be not smaller than 2 μm, and it is normally not larger than 20 μm and preferably not larger than 10 μm. As first insulating layer 11 has smaller thickness Da, bendability of TS panel 1 tends to be improved, and as first insulating layer 11 has larger thickness Da, water vapor transmission rate Pa of first insulating layer 1 can be lower.

The sum of thickness Dc of base layer 30 and thickness Da of first insulating layer 11 is preferably not smaller than 10 μm and more preferably not smaller than 15 μm and may be not smaller than 20 μm, and it is normally not larger than 100 μm and may be not larger than 80 μm, not larger than 60 μm, or not larger than 50 μm. Thickness Dc of base layer 30 is preferably larger than thickness Da of first insulating layer 11.

(Application of Touch Sensor Panel)

TS panel 1 can be incorporated in an image display device such as a liquid crystal display device or an organic EL display device and can be used as an image display device with TS panel. When TS panel 1 is excellent in bendability, it can be applied to a flexible display that can be folded or wound. When TS panel 1 is incorporated in an organic EL display device, it can be used as being layered together with a front plate or a circular polarization plate as in an optical laminate which will be described later.

(Modification of Touch Sensor Panel)

Figure 3:
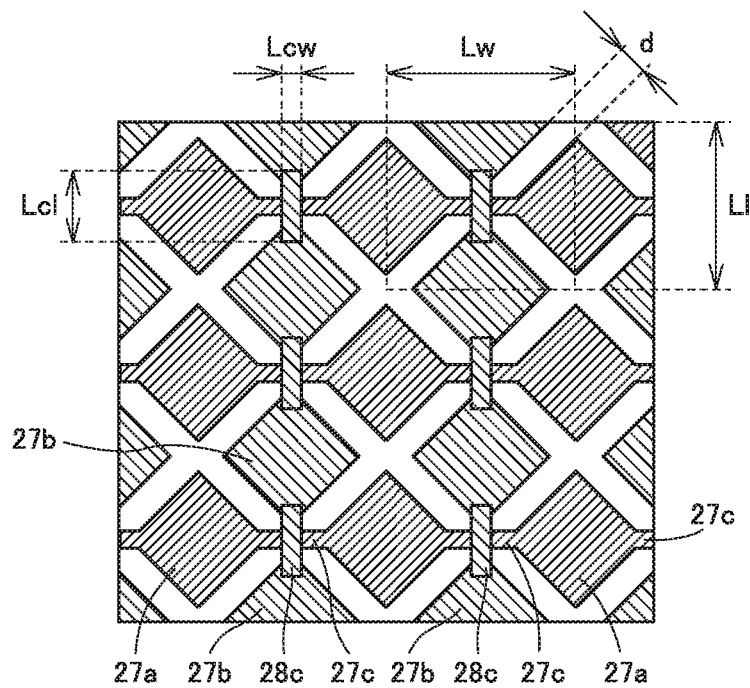
FIG. 3 is a partial plan view schematically showing another exemplary touch sensor panel according to the present invention.
Figure 4:
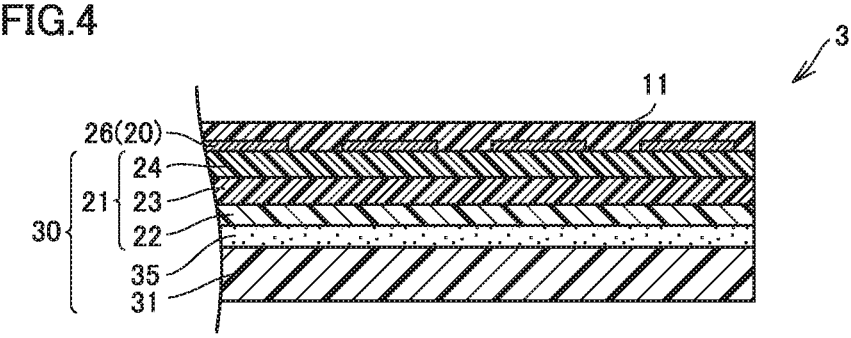
FIGS. 4 and 5 are cross-sectional views schematically showing other exemplary touch sensor panels according to the present invention.
Figure 5:
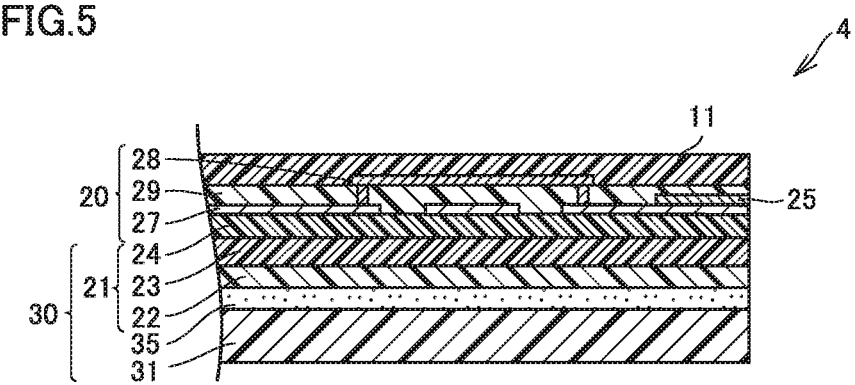

A TS panel in the present embodiment may have a structure shown in FIGS. 2 to 5. FIGS. 2 and 4 to 5 are cross-sectional views schematically showing other exemplary TS panels in the present embodiment, and FIG. 3 is a partial plan view schematically showing another exemplary TS panel in the present embodiment.

A TS panel 2 shown in FIG. 2 includes base layer 30, TS layer 20, and first insulating layer 11 in this order and base layer 30 is identical in layered structure to base layer 30 of TS panel 1 shown in FIG. 1. A patterned conductive layer included in TS layer 20 of TS panel 2 includes a first conductive layer 27 and a second conductive layer 28 in the direction of lamination sequentially from the side of base layer 30, and first conductive layer 27 is directly provided on base layer 30. TS layer 20 further includes a second insulating layer 29 between first conductive layer 27 and second conductive layer 28, and includes a via for electrical connection between first conductive layer 27 and second conductive layer 28 in an opening provided in second insulating layer 29. Second insulating layer 29 is provided to cover at least a surface of first conductive layer 27 opposite to base layer 30. Second conductive layer 28 is directly provided on a surface of second insulating layer 29 opposite to first conductive layer 27. Second insulating layer 29 may cover a side surface of first conductive layer 27 that extends along the direction of lamination. First insulating layer 1 is provided to cover at least a surface of second conductive layer 28 of TS layer 20 opposite to support layer 21. First insulating layer 11 may cover aside surface of second conductive layer 28 that extends along the direction of lamination.

In TS panel 2 shown in FIG. 2, second insulating layer 29 is provided also in a space between conductive portions at a distance in the plane direction of first conductive layer 27. Therefore, second insulating layer 29 includes also the insulating layer located in the space between the conductive portions at a distance in the plane direction of first conductive layer 27. In TS panel 2 shown in FIG. 2, first insulating layer 11 is provided also in a space between conductive portions at a distance in the plane direction of second conductive layer 28. Therefore, first insulating layer 11 includes also the insulating layer located in the space between the conductive portions at a distance in the plane direction of second conductive layer 28.

The surface of second insulating layer 29 opposite to first conductive layer 27 can be formed as being flat as shown in FIG. 2, rather than being in a shape in conformity with a height difference attributed to first conductive layer 27. The surface of first insulating layer 11 opposite to TS layer 20 can also be formed as being flat, rather than being in the shape in conformity with a height difference attributed to second conductive layer 28.

First conductive layer 27 serves, for example, as a touch electrode of TS layer 20. Second conductive layer 28 is, for example, a part of a bridge interconnection. The bridge interconnection includes a via in an opening provided in second insulating layer 29 and it is electrically connected to the touch electrode implemented by first conductive layer 27 through the via. TS panel 2 can include a sensor region Se and an interconnection region Tr as shown in FIG. 2. Sensor region Se is a region normally provided in a display area where a touch electrode is arranged, and functions as a sensor that senses a touch position. Interconnection region Tr is a region normally provided around the display area where a connection interconnection 25 for connection to an external circuit or a drive circuit is provided. In interconnection region Tr, connection interconnection 25 is provided on first conductive layer 27 and second insulating layer 29 can be provided to cover connection interconnection 25. TS panel 2 may include a connection region (not shown) where a connection terminal for electrical connection to the outside is provided.

TS panel 2 shown in FIG. 2 can have a structure, for example, as in the partial plan view shown in FIG. 3. For example, as shown in FIG. 3, first conductive layer 27 can include unit patterns 27a and 27b in a polygonal shape alternately arranged in a diagonal direction (in diagonal lattices) in FIG. 3 and a coupling portion 27c that couples unit patterns 27a to each other in a lateral direction in FIG. 3. Second conductive layer 28 can include a coupling portion 28c that couples unit patterns 27b to each other along a vertical direction in FIG. 3. Unit pattern 27a and unit pattern 27b are arranged at a distance d as shown with a blank portion (a portion without hatching) in FIG. 3 and they are electrically and spatially isolated from each other.

Thickness Da of first insulating layer 11 in TS panel 2 refers to a maximum thickness of first insulating layer 11 as described above. Since first insulating layer 11 is provided also in the space between the conductive portions at a distance in the plane direction of second conductive layer 28 in TS panel 2 shown in FIG. 2, the thickness refers to a distance from the surface of first insulating layer 11 opposite to base layer 30 to the surface on the side of base layer 30, of first insulating layer 11 located in the space between the conductive portions at a distance in the plane direction of second conductive layer 28 (in FIG. 2, the surface of second conductive layer 28 on the side of base layer 30) as shown in FIG. 2. Thickness D of base layer 30 is the same as that in TS panel 1 shown in FIG. 1.

A TS panel 3 shown in FIG. 4 represents an example where support layer 21 includes a separation layer 22, a protective layer 23, and a refraction index adjustment layer 24 sequentially from the side of substrate layer 31 in TS panel 1 shown in FIG. 1. A TS panel 4 shown in FIG. 5 represents an example in which support layer 21 includes separation layer 22, protective layer 23, and refraction index adjustment layer 24 sequentially from the side of substrate layer 31 in TS panel 2 shown in FIG. 2. Separation layer 22 is formed on a carrier substrate made of glass or the like and serves to separate from the carrier substrate together with separation layer 22 itself, patterned conductive layer 26, first conductive layer 27, second insulating layer 29, second conductive layer 28, and first insulating layer 11 formed on separation layer 22. Refraction index adjustment layer 24 serves to adjust an index of refraction.

Though TS panels 3 and 4 are described with reference to the example where support layer 21 includes all of separation layer 22, protective layer 23, and refraction index adjustment layer 24, they are not limited as such. Support layer 21 of the TS panel may include any one of these layers or two of them. Support layer 21 preferably includes at least separation layer 22.

<Optical Laminate>

Figure 6:
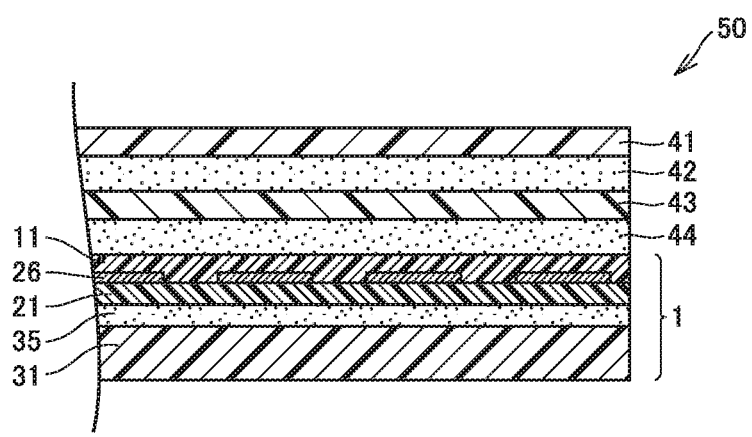
FIG. 6 is a cross-sectional view schematically showing an exemplary optical laminate according to the present invention.
Figure 7:
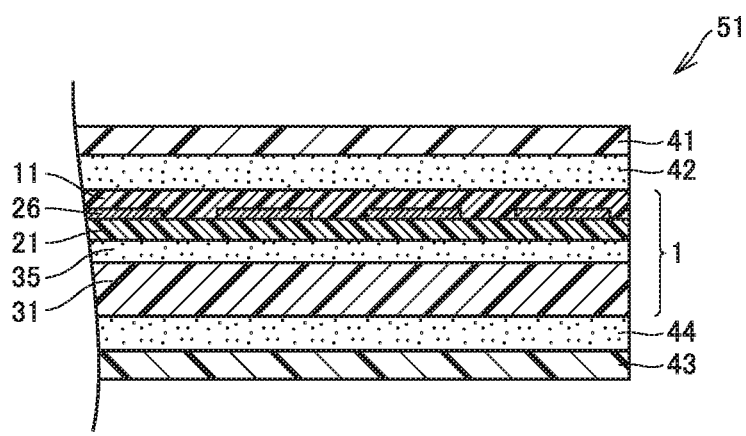
FIG. 7 is a cross-sectional view schematically showing another exemplary optical laminate according to the present invention.

FIG. 6 is a cross-sectional view schematically showing an exemplary optical laminate 50 in the present embodiment. FIG. 7 is a cross-sectional view schematically showing another exemplary optical laminate 51 in the present embodiment. Optical laminates 50 and 51 can each include a front plate 41, a circular polarization plate 43, and the TS panel described above. Though optical laminates 50 and 51 shown in FIGS. 6 and 7 each include TS panel 1 shown in FIG. 1 by way of example, they may include any of TS panels 2 to 4 shown in FIGS. 2, 4, and 5.

Optical laminate 50 shown in FIG. 6 and optical laminate 51 shown in FIG. 7 are different from each other in position where TS panel 1 is layered. Optical laminate 50 shown in FIG. 6 includes front plate 41, a second bonding layer 42, circular polarization plate 43, a third bonding layer 44, and TS panel 1 in this order. Optical laminate 51 shown in FIG. 7 includes front plate 41, second bonding layer 42, TS panel 1, third bonding layer 44, and circular polarization plate 43 in this order. Front plate 41 can be arranged on an outermost surface of an image display device.

Optical laminates 50 and 51 each include TS panel 1 including base layer 30 having water vapor transmission rate Pc within the range above and first insulating layer 11 having water vapor transmission rate Pa within the range above. Therefore, when optical laminate 50 is exposed to a high-temperature and high-humidity environment, influence by moisture on patterned conductive layer 26 can be lessened. Occurrence of poor drive such as failure in accurate recognition of a touch position can thus be suppressed and variation in index of refraction caused by moisture absorbed at the time of exposure of optical laminate 50 or 51 to the high-temperature and high-humidity environment can be suppressed. In particular, as shown in FIG. 6, in optical laminate 50 where circular polarization plate 43 is provided on a visually recognized side of TS panel 1, variation in index of refraction tends to more readily be recognized owing to the presence of circular polarization plate 43. Therefore, TS panel 1 above can suitably be employed.

Optical laminates 50 and 51 can be used, for example, as being incorporated in an image display device such as an organic EL display device, with an optical display element being layered on the side of TS panel 1. When optical laminates 50 and 51 are excellent in bendability, they can be applied to a flexible display that can be folded or wound.

Each layer in the TS panel and the optical laminate will be described below.

(Base Layer)

Base layer 30 is used for supporting TS layer 20 and can include, for example, substrate layer 31, first bonding layer 35, and support layer 21 as set forth above. Thickness Dc or toughness Tc of base layer 30 is as described above, and it should only be set in consideration of strength, workability such as handleability, and bendability of the TS panel.

(Substrate Layer)

Substrate layer 31 is provided on support layer 21 with first bonding layer 35 being interposed, and provided to give strength to TS layer 20. A water vapor transmission rate of substrate layer 31 at a temperature of 40° C. and a humidity of 90% RH is preferably not higher than 900 g/(m²•24 hr), more preferably not higher than 500 g/(m²•24 hr), further preferably not higher than 300 g/(m²•24 hr), and still further preferably not higher than 200 g/(m²•24 hr), and may be not higher than 100 g/(m²•24 hr) or not higher than 50 g/(m²•24 hr). The water vapor transmission rate of substrate layer 31 may exceed 0 g/(m²•24 hr). A material for forming substrate layer 31 preferably satisfies the water vapor transmission rate above, and when the TS panel is applied to a flexible display, in particular, a film formed of a resin material is preferred.

Examples of the resin material include: a polyolefin based resin such as polyethylene and polypropylene; a cyclic polyolefin based resin such as a norbornene based polymer; a polyester based resin such as polyethylene terephthalate and polyethylene naphthalate; a (meth)acrylic acid based resin such as (meth)acrylic acid and poly(methyl (meth) acrylate); a cellulose ester based resin such as triacetyl cellulose, diacetyl cellulose, and cellulose acetate propionate; a vinyl alcohol based resin such as polyvinyl alcohol and polyvinyl acetate; a polycarbonate based resin; a polystyrene based resin; a polyarylate based resin; a polysulfone based resin; a polyether sulfone based resin; a polyamide based resin; a polyimide based resin; a polyether ketone based resin; a polyphenylene sulfide based resin; a polyphenylene oxide based resin; and a mixture thereof. Among these resins, any of a cyclic polyolefin based resin and a (meth)acrylic acid based resin or a mixture thereof is preferably used. "(Meth)acrylic" means "at least one of acrylic and methacrylic" and it is also applicable to the denotation "(meth)acrylate".

When substrate layer 31 is made from a film formed of a resin material, any additive may be added to substrate layer 31. Examples of the additive include an ultraviolet absorbent, an antioxidant, a lubricant, a plasticizer, a release agent, an anti-coloring agent, a flame retardant, a nucleating agent, an antistatic agent, a pigment, and a coloring agent.

Substrate layer 31 may be formed from a single layer containing a single type of resin material or containing two or more types of resin materials as being mixed, or may have a multi-layered structure in which two or more layers are in direct contact. When the substrate layer has the multi-layered structure, resins making up layers may be identical or different.

(Support Layer)

Support layer 21 supports TS layer 20 (the patterned conductive layer (the first conductive layer and the second conductive layer) and the second insulating layer) or first insulating layer 11. Support layer 21 can include separation layer 22, protective layer 23, refraction index adjustment layer 24, an undercoat layer for improvement of adhesion between layers, and a resin film. Support layer 21 preferably includes at least separation layer 22. Support layer 21 normally includes no bonding layer.

Though a thickness of support layer 21 is not particularly limited, the thickness is normally not smaller than 0.1 μm, may be not smaller than 1 μm or not smaller than 5 μm, and is normally not larger than 20 μm and preferably not larger than 10 μm.

(Separation Layer)

Separation layer 22 is used in a process of manufacturing TS layer 20 and first insulating layer 11, and used for peel-off from a carrier substrate made of glass or the like. In the process of manufacturing TS layer 20 and first insulating layer 11, separation layer 22 is formed on the carrier substrate, and the patterned conductive layer (the first conductive layer and the second conductive layer) or first insulating layer 11 is formed on separation layer 22. Separation layer 22 is used for peeling off and separating separation layer 22, the patterned conductive layer (the first conductive layer and the second conductive layer), and first insulating layer 11 from the carrier substrate. Separation layer 22 can be used as a layer that covers and protects patterned conductive layer 26 or first conductive layer 27 in TS layer 20, and may perform a function to electrically insulate patterned conductive layer 26 or first conductive layer 27.

Separation layer 22 should only be formed of a material peelable from the carrier substrate, and can be made from an inorganic layer or an organic layer.

Examples of a material for forming the inorganic layer include a silicon oxide.

Examples of a material for forming the organic layer include a resin material.

Examples of the resin material include a polyimide based resin, an epoxy based resin, a polyvinyl alcohol based resin, a polyamic acid based resin, a polyamide based resin, a polyethylene based resin, a polystyrene based resin, a polynorbornene based resin, a phenylmaleimide copolymer based resin, a polyazobenzene based resin, a polyphenylene phthalamide based resin, a polyester based resin, a poly (methyl (meth)acrylate) based resin, a poly (meth)arylate based resin, a cinnamate based resin, a coumarin based resin, a phthalimidine based resin, a chalcone based resin, an aromatic acetylene based resin, and a mixture thereof.

Though a thickness of separation layer 22 is not particularly limited, the thickness may be not smaller than 0.01 μm or not smaller than 0.05 μm and not larger than 1 μm or not larger than 0.5 μm.

Separation layer 22 can be formed on the carrier substrate by application, sputtering, or vapor deposition, depending on a material therefor.

(Protective Layer)

Protective layer 23 can be provided on a first insulating layer 11 side of separation layer 22, and it is preferably provided as being in direct contact with separation layer 22. Protective layer 23 may be patterned. Protective layer 23 can be used as a layer that covers and protects, together with separation layer 22, patterned conductive layer 26 or first conductive layer 27. Protective layer 23 can perform a function to electrically insulate patterned conductive layer 26 or first conductive layer 27.

Protective layer 23 can include at least one of an organic insulating layer and an inorganic insulating layer, and such a layer can be formed by spin coating, sputtering, or vapor deposition. Protective layer 23 formed by such a method may be patterned as necessary.

When protective layer 23 is formed from an organic insulating layer, the organic insulating layer can be formed of a resin material. For example, a material formed of a curable composition containing polyol and a melamine curing agent can be used as the resin material. Examples of polyol include a polyethylene glycol derivative, a polyester glycol derivative, and a polycaprolactone glycol derivative. Examples of the melamine curing agent include a (methoxymethyl)melamine derivative, a methyl melamine derivative, a butyl melamine derivative, an isobutoxy melamine derivative, and a butoxy melamine derivative.

Protective layer 23 may be a layer of a cured product of a hybrid of organic and inorganic curable compositions. In this case, a mixture of the above-described material for forming the organic insulating layer with silica based nanoparticles, silicon based nanoparticles, or glass nanofibers as an inorganic substance can be used.

Though a thickness of protective layer 23 is not particularly limited, the thickness may be not smaller than 0.1 μm or not smaller than 0.5 μm and not larger than 10 μm or not larger than 5 μm.

Protective layer 23 can be formed on separation layer 22 by application, sputtering, or vapor deposition, depending on a material therefor.

(Refraction Index Adjustment Layer)

Refraction index adjustment layer 24 serves to adjust an index of refraction of the TS panel and can provide a prescribed index of refraction to the TS panel.

Though a material for forming refraction index adjustment layer 24 is not particularly limited, a resin material, a resin material containing a pigment, or a metal compound may be adopted as the material. The resin material is not particularly limited. A known material such as a thermosetting resin or an active energy ray curable resin can be used, and examples thereof include a (meth)acrylic resin, an epoxy based resin, a polyimide based resin, and a polyurethane based resin. Examples of a pigment for adjustment of the index of refraction by being added to the resin material include silicon oxide, aluminum oxide, antimony oxide, tin oxide, titanium oxide, zirconium oxide, and tantalum oxide. The pigment has an average particle size preferably not larger than 0.1 μm. Examples of the metal compound include metal oxide or metal nitride such as titanium oxide, tantalum oxide, zirconium oxide, zinc oxide, tin oxide, silicon oxide, niobium oxide, indium oxide, titanium oxynitride, titanium nitride, silicon oxynitride, and silicon nitride.

Though a thickness of refraction index adjustment layer 24 is not particularly limited, the thickness may be not smaller than 0.1 μm, not smaller than 1 μm, or not smaller than 5 μm, and not larger than 20 μm or not larger than 10 μm.

Refraction index adjustment layer 24 can be formed on separation layer 22 or protective layer 23 if protective layer 23 is present, by application, sputtering, or vapor deposition, depending on a material therefor.

(Resin Film)

A material for the protective layer provided on one surface or opposing surfaces of a linear polarization layer or a material the same as a material for a resin film that forms the front plate can be used for a resin film that can be used for the support layer. Specifically, polyimide, polyamide, polyamide-imide, and a cyclic polyolefin based resin are preferred. A thickness of the resin film is preferably small and the thickness can be not larger than 15 μm.

(First Bonding Layer)

First bonding layer 35 serves to bond substrate layer 31 and support layer 21 to each other. First bonding layer 35 is normally provided as being in direct contact with substrate layer 31 and support layer 21. First bonding layer 35 is preferably formed from an adhesive layer formed of an adhesive composition or from a pressure-sensitive adhesive layer formed of a pressure-sensitive adhesive composition. First bonding layer 35 is preferably formed from the adhesive layer. First bonding layer 35 is preferably formed of a material low in permeability.

When first bonding layer 35 is formed from the adhesive layer, an adhesive composition used for forming the adhesive layer is not particularly limited, and examples of the adhesive composition include a water based adhesive or an active energy ray curable adhesive.

Examples of the water based adhesive include a polyvinyl alcohol based resin aqueous solution and a water-based two-component urethane based emulsion adhesive. The active energy ray curable adhesive refers to an adhesive that is cured by irradiation with active energy rays such as ultraviolet rays, and examples thereof can include an active energy ray curable adhesive containing a polymerizable compound and a photopolymerization initiator, an active energy ray curable adhesive containing a photoreactive resin, and an active energy ray curable adhesive containing a binder resin and a photoreactive cross-linking agent. Examples of the polymerizable compound include a photopolymerizable monomer such as a photocurable epoxy based monomer, a photocurable (meth)acrylic monomer, and a photocurable urethane based monomer and an oligomer derived from these monomers. Examples of the photopolymerization initiator can include an initiator containing a substance that generates active species such as neutral radicals, anionic radicals, or cationic radicals by irradiation with active energy rays such as ultraviolet rays.

When first bonding layer 35 is formed from a pressure-sensitive adhesive layer, a pressure-sensitive adhesive composition used for forming the pressure-sensitive adhesive layer is not particularly limited, and the pressure-sensitive adhesive composition should only contain as a main component, a polymer such as a (meth)acrylic polymer, a urethane based polymer, a polyester based polymer, a silicone based polymer, a polyvinyl ether based polymer, and a rubber based polymer. The main component herein refers to a component that occupies at least 50 mass % of a total solid content of the pressure-sensitive adhesive composition. The pressure-sensitive adhesive composition may be curable by active energy rays or heat.

A polymer or a copolymer containing as a monomer, one or two or more types of (meth)acrylic ester such as butyl (meth)acrylate, ethyl (meth)acrylate, isooctyl (meth)acrylate, and 2-ethyl hexyl (meth)acrylate is suitably employed as the (meth)acrylic polymer. A polar monomer is preferably copolymerized with a base polymer. Examples of the polar monomer can include a monomer containing a carboxyl group, a hydroxyl group, an amide group, an amino group, or an epoxy group such as (meth)acrylate, 2-hydroxypropyl (meth)acrylate, hydroxyethyl (meth)acrylate, (meth)acrylamide, N,N-dimethylaminoethyl (meth)acrylate, or glycidyl (meth)acrylate.

An active energy ray curable pressure-sensitive adhesive composition has a property of being cured by irradiation with active energy rays such as ultraviolet rays or electron beams, has pressure-sensitive adhesiveness also before irradiation with active energy rays and can be in intimate contact with an object such as a film, and has a property of being cured by irradiation with active energy rays as being variable in strength of intimate contact. The active energy ray curable pressure-sensitive adhesive composition is preferably ultraviolet-ray curable. The active energy ray curable pressure-sensitive adhesive composition further contains an active energy ray polymerizable compound in addition to a base polymer and a cross-linking agent. The active energy ray curable pressure-sensitive adhesive composition may further contain a photopolymerization initiator or a photosensitizer as necessary.

The pressure-sensitive adhesive composition can contain, in addition to the polymer, a solvent and an additive such as a tackifier, a softener, a filler (metal powders or other inorganic powders), an antioxidant, an ultraviolet absorbent, a dye, a pigment, a coloring agent, an antifoaming agent, an anticorrosive, and a photopolymerization initiator. When the active energy ray curable pressure-sensitive adhesive composition is used, a cured product having a desired degree of curing by irradiation of the formed pressure-sensitive adhesive layer with active energy rays can be obtained.

The pressure-sensitive adhesive layer can be formed by applying an organic solvent diluent of the pressure-sensitive adhesive composition onto a substrate and drying the organic solvent diluent.

Though a thickness of first bonding layer 35 is not particularly limited, when first bonding layer 35 is formed from the adhesive layer, the thickness is preferably not smaller than 0.1 µm and may be not smaller than 0.5 µm, and is preferably not larger than 10 µm and may be not larger than 5 µm. First bonding layer 35 is preferably formed from the adhesive layer.

When first bonding layer 35 is formed from the pressure-sensitive adhesive layer, a thickness of first bonding layer 35 is preferably not smaller than 2 µm and may be not smaller than 15 µm, not smaller than 20 µm, or not smaller than 25 µm, and is normally not larger than 200 µm and may be not larger than 100 µm or not larger than 50 µm.

(First Insulating Layer)

First insulating layer 11 is provided on a patterned conductive layer 26 side or a second conductive layer 28 side of TS layer 20 and performs a function to electrically insulate patterned conductive layer 26 or second conductive layer 28. As set forth above, water vapor transmission rate Pa of first insulating layer 11 at a temperature of 40° C. and a humidity of 90% RH is not higher than 900 g/(m$^2$•24 hr).

When patterned conductive layer 26 has a single-layered structure or a multi-layered structure in which layers are in direct contact, first insulating layer 11 may be provided to cover the surface of patterned conductive layer 26 opposite to support layer 21 and to fill the space between the conductive layers provided in a pattern at a distance in the plane direction of patterned conductive layer 26. When the patterned conductive layer is made from a plurality of conductive layers arranged at a distance from each other in the direction of lamination like first conductive layer 27 and second conductive layer 28, first insulating layer 11 is provided to cover the surface of the conductive layer (for example, second conductive layer 28) opposite to support layer 21 that is located farthest from support layer 21.

A material for forming first insulating layer 11 is not particularly limited so long as the material can electrically insulate patterned conductive layer 26 or second conductive layer 28, and an inorganic insulating substance or an organic insulating substance can be employed. Examples of the inorganic insulating substance include inorganic particles of silicon oxide. Examples of the organic insulating substance include: a thermosetting resin or an active energy ray curable resin such as a (meth)acrylic resin and a melanin based resin; a silicone based resin such as polydimethylsiloxane (PDMS) and polyorganosiloxane (POS); a polyimide based resin; a polyurethane based resin; and a photosensitive resin composition disclosed in Japanese Patent Laying-Open No. 2016-14877. The inorganic insulating substance and the organic insulating substance may be used as being mixed or each of them may be used alone, as a material for forming first insulating layer 11. When the inorganic insulating substance and the organic insulating substance are used as being mixed, a ratio of inorganic particles in first insulating layer 11 is preferably lower than 10 weight %, more preferably lower than 5 weight %, or further preferably lower than 1 weight %, of a total weight of the first insulating layer. First insulating layer 11 does not have to contain inorganic particles. By setting such a range, a reflectance can be lowered.

Thickness Da of first insulating layer 11 is as described above, and should only be set in consideration of insulation of patterned conductive layer 26 or second conductive layer 28, permeability of first insulating layer 11, and bendability of the TS panel.

First insulating layer 11 can be formed on patterned conductive layer 26 or second conductive layer 28 by application, sputtering, or vapor deposition, depending on a material therefor.

(Touch Sensor Layer)

TS layer 20 includes the patterned conductive layer as described above. When the patterned conductive layer includes two or more conductive layers in the direction of lamination, TS layer 20 includes a layer (for example, second insulating layer 29) located between the conductive layers.

(Patterned Conductive Layer)

The patterned conductive layer (including an example where the patterned conductive layer is formed from the first conductive layer and the second conductive layer) serves as an electrode or an interconnection for detection of a touch position on the TS panel, and it is normally formed in a pattern. Though the patterned conductive layer may have a single-layered structure as shown in FIG. 1 or a multi-layered structure in which a plurality of layers are in direct contact, it may have a laminated structure in which two or more conductive layers are arranged at a distance in the direction of lamination as shown in FIG. 2.

The patterned conductive layer can be such that patterns in a circular shape, an elliptical shape, or a polygonal shape such as a quadrangular shape or a hexagonal shape are arranged in the plane direction independently of one another. When the patterned conductive layer has the single-layered structure or the multi-layered structure, a thickness thereof can be not smaller than 0.01 µm, may be not smaller than 0.05 µm or not smaller than 0.1 µm, and is normally not larger than 5 µm, preferably not larger than 1 m, and more preferably not larger than 0.5 µm.

The patterned conductive layer is preferably formed as being visually unrecognizable when it is included as the TS panel in an optical laminate or an image display device. A material for forming the patterned conductive layer is not particularly limited. Though a transparent conductive substance is preferred, a metal material consisting of a metal alone may be applicable.

The patterned conductive layer may be formed, for example, of a material selected from among: a metal oxide selected from the group consisting of indium tin oxide (ITO), indium zinc oxide (IZO), indium zinc tin oxide (IZTO), aluminum zinc oxide (AZO), gallium zinc oxide (GZO), fluorine-doped tin oxide (FTO), indium tin oxide-silver-indium tin oxide (ITO-Ag-ITO), indium zinc oxide-silver-indium zinc oxide (IZO—Ag—IZO), indium zinc tin oxide-silver-indium zinc tin oxide (IZTO-Ag-IZTO), and aluminum zinc oxide-silver-aluminum zinc oxide (AZO-Ag-AZO); a metal selected from the group consisting of gold (Au), silver (Ag), copper (Cu), molybdenum (Mo), and APC; nanowires of a metal selected from the group consisting of gold, silver, copper, and lead; a carbon based substance selected from the group consisting of carbon nanotube (CNT) and graphene; and a conductive polymeric substance selected from the group consisting of poly(3,4-ethylenedioxythiophene) (PEDOT) and polyaniline (PANI). Such a material can be used alone or two or more types of them can be used as being mixed, and indium tin oxide is preferred. Crystalline or non-crystalline indium tin oxide can be used.

The patterned conductive layer can be formed on support layer 21 or second insulating layer 29 by application, sputtering, or vapor deposition, depending on a material therefor. For forming a conductive layer in a pattern, the conductive layer may be formed with the use of a mask, or the conductive layer may be formed in a pattern by photolithography after the conductive layer is formed.

As shown in FIG. 2, when the patterned conductive layer has the laminated structure including first conductive layer 27 provided on the side of support layer 21 and second conductive layer 28 provided on first conductive layer 27 with second insulating layer 29 being interposed, both of first conductive layer 27 and second conductive layer 28 can be formed in a pattern. First conductive layer 27 and second conductive layer 28 can be formed in a pattern, for example, such that first conductive layer 27 serves as the touch electrode and second conductive layer 28 forms a part of the bridge interconnection. When the patterned conductive layer includes first conductive layer 27 and second conductive layer 28, a space is provided in second insulating layer 29 located between first conductive layer 27 and second conductive layer 28 and a via for electrical connection between first conductive layer 27 and second conductive layer 28 can be provided in this space. Examples of a material for forming first conductive layer 27, second conductive layer 28, and the via include a material for forming the patterned conductive layer. Examples of a method of forming first conductive layer 27, second conductive layer 28, and the via in a pattern include the method of forming the patterned conductive layer described above.

A thickness of first conductive layer 27 and second conductive layer 28 can independently be not smaller than 0.01 μm and may be not smaller than 0.05 μm or not smaller than 0.1 μm, and is normally not larger than 5 μm and preferably not larger than 1 μm and more preferably not larger than 0.5 μm.

(Connection Interconnection)

Connection interconnection 25 (FIG. 2) is an interconnection for connection to an external circuit or a drive circuit, and it is normally provided on first conductive layer 27 located around a display area. Connection interconnection 25 may have a single-layered structure or a multilayered structure in which a plurality of layers are in direct contact. A thickness of connection interconnection 25 can be not smaller than 0.01 μm, may be not smaller than 0.05 μm or not smaller than 0.1 μm, and is normally not larger than 5 μm, preferably not larger than 1 μm, and more preferably not larger than 0.5 μm.

Though a material for forming connection interconnection 25 is not particularly limited, the connection interconnection can be formed of a transparent conductive substance or a metal material such as a metal alone or a metal alloy described in connection with the patterned conductive layer.

(Second Insulating Layer)

Second insulating layer 29 is provided between first conductive layer 27 and second conductive layer 28 that form the patterned conductive layer, and performs a function to electrically insulate first conductive layer 27 and second conductive layer 28 from each other. Second insulating layer 29 may be provided to cover the surface opposite to support layer 21, of first conductive layer 27 provided on support layer 21 and to fill a space between the conductive layers at a distance in the plane direction. Second conductive layer 28 is provided on a side of second insulating layer 29 opposite to support layer 21. Second insulating layer 29 is provided with an opening, and by providing a via in the opening, first conductive layer 27 and second conductive layer 28 can electrically be connected to each other.

Examples of a material for forming second insulating layer 29 include the material exemplified as the material for forming first insulating layer 11.

A thickness of second insulating layer 29 can be, for example, not smaller than 0.1 μm, is preferably not smaller than 1 μm and more preferably not smaller than 1.5 μm, and may be not smaller than 2 μm, and is normally not larger than 30 μm, preferably not larger than 20 μm, and more preferably not larger than 10 μm. The thickness of second insulating layer 29 refers to a maximum thickness of second insulating layer 29.

(Front Plate)

Front plate 41 can function as a layer that protects a display element of an image display device, it is formed from a plate-shaped body through which light can pass, and the plate-shaped body is normally preferably made of glass or a resin. Front plate 41 may be formed from a laminate of a resin film and a glass film. Front plate 41 can be arranged on the outermost surface of the image display device. Front plate 41 is preferably made from a resin film or a resin film with hard coat layer that has improved hardness by being provided with a hard coat layer on at least one surface thereof. Front plate 41 may perform a blue light cut-off function or a viewing angle adjustment function.

A resin film that forms front plate 41 is not limited so long as light can pass therethrough. Examples of the resin film include a film formed of a polymer such as triacetyl cellulose, acetyl cellulose butyrate, an ethylene-vinyl acetate copolymer, propionyl cellulose, butylyl cellulose, acetyl propionyl cellulose, polyester, polystyrene, polyamide, polyether imide, poly (meth)acrylic, polyimide, polyether sulfone, polysulfone, polyethylene, polypropylene, polymethylpentene, polyvinyl chloride, polyvinylidene chloride, polyvinyl alcohol, polyvinyl acetal, polyether ketone, polyether ether ketone, polyether sulfone, polymethyl (meth)acrylate, polyethylene terephthalate, polybutylene terephthalate, polyethylene naphthalate, polycarbonate, and polyamide-imide. Such a polymer can be used alone or two or more types thereof can be used as being mixed. When the image display device is implemented by a flexible display, a resin film formed of a polymer such as polyimide, polyamide, or polyamide-imide that can be composed to be excellent in flexibility and high in strength and transparency is suitably employed.

The resin film with hard coat layer that forms front plate 41 may include the hard coat layer on one surface or opposing surfaces thereof. When the resin film includes the hard coat layer on each of the opposing surfaces, the hard coat layer may be identical or different in composition or thickness. The resin film with hard coat layer can be higher in hardness or resistance against scratch than a resin film without hard coat layer.

The hard coat layer of the resin film with hard coat layer is formed, for example, from a layer obtained by curing an ultraviolet curable resin. Examples of the ultraviolet curable resin include: a (meth)acrylic resin such as a monofunctional (meth)acrylic resin, a polyfunctional (meth)acrylic resin, and a polyfunctional (meth)acrylic resin having a dendrimer structure; a silicone based resin; a polyester based resin; a urethane based resin; an amide based resin; and an epoxy based resin. The hard coat layer may contain an additive for improvement in hardness. The additive is not limited, and examples thereof include inorganic fine particles, organic fine particles, or a mixture thereof.

(Circular Polarization Plate)

Circular polarization plate 43 can include a linear polarization layer and a retardation layer. Circular polarization plate 43 is arranged such that the linear polarization layer is located on a side of second bonding layer 42 and the retardation layer is located on a side of third bonding layer 44 in optical laminate 50 shown in FIG. 6. In other words, the linear polarization layer and the retardation layer are arranged sequentially from the visually recognized side. Circular polarization plate 43 can convert light emitted from a side of a display element of the image display device including optical laminate 50 through optical laminate 50 into circular polarization. Since circular polarization plate 43 can suppress emission of reflected external light, it can provide optical laminate 50 with a function as an antireflection film.

(Linear Polarization Layer)

The linear polarization layer performs a function to allow passage of linear polarization in one direction selectively from beams of non-polarization such as natural light. Examples of the linear polarization layer include a stretched film to which a dichroic dye has adsorbed and a liquid crystal layer that contains a cured product of a polymerizable liquid crystal compound and a dichroic dye, the dichroic dye being dispersed and aligned in the cured product of the polymerizable liquid crystal compound. The dichroic dye refers to a dye having absorbency different between a direction of a long axis of a molecule and a direction of a short axis thereof.

(Linear Polarization Layer Including Stretched Film)

A stretched film to which a dye has adsorbed is normally manufactured in steps of uniaxially stretching a polyvinyl alcohol based resin film, adsorbing a dichroic dye such as iodine by dyeing the polyvinyl alcohol based resin film with the dichroic dye, treating the polyvinyl alcohol based resin film to which the dichroic dye has adsorbed with a boric acid aqueous solution, and washing the polyvinyl alcohol based resin film with water after treatment with the boric acid aqueous solution. The obtained film may be used as the linear polarization layer as it is, or a linear polarization plate having one surface or opposing surfaces provided with a protective layer. A linear polarization layer thus obtained has a thickness preferably from 2 µm to 40 µm.

A polyvinyl alcohol based resin is obtained by saponifying a polyvinyl acetate based resin. Polyvinyl acetate which is a homopolymer of vinyl acetate and a copolymer of vinyl acetate and another monomer copolymerizable therewith are employed as the polyvinyl acetate based resin. Examples of another monomer copolymerizable with vinyl acetate include unsaturated carboxylic acid, olefin, vinyl ether, unsaturated sulfonic acid, and (meth)acrylamide having an ammonium group.

A degree of saponification of the polyvinyl alcohol based resin is normally approximately from 85 to 100 mol % and preferably not lower than 98 mol %. The polyvinyl alcohol based resin may be modified, and for example, polyvinyl formal or polyvinyl acetal modified by aldehyde can also be used. A degree of polymerization of the polyvinyl alcohol based resin is normally approximately from 1,000 to 10,000 and preferably within a range from 1,500 to 5,000.

A film made of such a polyvinyl alcohol based resin is used as a raw film of the linear polarization layer. A method of forming a film of the polyvinyl alcohol based resin is not particularly limited, and the film can be formed by a known method. A thickness of the polyvinyl alcohol based raw film can be, for example, approximately from 10 µm to 150 µm.

Uniaxial stretching of the polyvinyl alcohol based resin film can be performed before, simultaneously with, or after dyeing with the dichroic dye. When uniaxial stretching is performed after dyeing, it may be performed before or during treatment with boric acid. Uniaxial stretching can also be performed in a plurality of these stages. In uniaxial stretching, the film may uniaxially be stretched between rolls different in peripheral velocity or by using a hot roll. Uniaxial stretching may be dry stretching in which stretching is performed in the atmosphere or wet stretching in which the polyvinyl alcohol based resin film is stretched with the film being swollen by a solvent. A stretching ratio is normally set approximately to ×3 to ×8.

A thickness of the linear polarization plate including the linear polarization layer formed from a stretched film and provided with a protective layer on one surface or opposing surfaces thereof may be, for example, not smaller than 1 µm and not larger than 100 µm, not smaller than 5 µm, or not smaller than 7 µm, and not larger than 700 µm, not larger than 50 µm, not larger than 20 n, or not larger than 10 µm.

A material for the protective layer provided on one surface or opposing surfaces of the linear polarization layer is not particularly limited, and examples thereof can include a known resin in the field of the art such as a cyclic polyolefin-based resin, a cellulose acetate based resin composed of such a resin as triacetyl cellulose and diacetyl cellulose, a polyester based resin such as polyethylene terephthalate, polyethylene naphthalate, and polybutylene terephthalate, a polycarbonate based resin, a (meth)acrylic resin, and a polypropylene based resin. From a point of view of decrease in thickness, the thickness of the protective layer is normally not larger than 300 µm, preferably not larger than 200 µm and more preferably not larger than 100 µm, and is normally not smaller than 5 µm and preferably not smaller than 20 sm. The protective layer may be formed from a film, and the protective layer in a film form may have a phase difference. When the protective layer is formed from a film, the linear polarization layer and the protective layer can be layered with a pressure-sensitive adhesive layer or an adhesive layer being interposed. The pressure-sensitive adhesive layer and the adhesive layer can be formed of the pressure-sensitive adhesive composition and the adhesive composition described above, respectively.

(Linear Polarization Layer Including Liquid Crystal Layer)

A polymerizable liquid crystal compound used for forming a liquid crystal layer refers to a compound including a polymerizable reactive group and exhibiting liquid crystallinity. A polymerizable reactive group refers to a group involved with polymerization reaction and it is preferably a photopolymerizable reactive group. The photopolymerizable reactive group refers to a group that can be involved with polymerization reaction owing to active radicals or acid generated by a photopolymerization initiator. Examples of a photopolymerizable functional group include a vinyl group, a vinyloxy group, a 1-chlorovinyl group, an isopropenyl group, a 4-vinyl phenyl group, an acryloyloxy group, a methacryloyloxy group, an oxiranyl group, and an oxetanyl group. Among these, an acryloyloxy group, a methacryloyloxy group, a vinyloxy group, an oxiranyl group, and an oxetanyl group are preferred and an acryloyloxy group is more preferred. A type of the polymerizable liquid crystal compound is not particularly limited, and a rod-shaped liquid crystal compound, a disc-shaped liquid crystal compound, and a mixture thereof can be employed. Liquid crystallinity of the polymerizable liquid crystal compound may be thermotropic or lyotropic, and a phase order structure thereof may be nematic or smectic.

A dichroic dye having a relative maximum absorption wavelength (λMAX) within a range from 300 to 700 nm is preferred as a dichroic dye to be contained in the linear polarization layer made from the liquid crystal layer. Examples of the dichroic dye include an acridine dye, an oxazine dye, a cyanine dye, a naphthalene dye, an azo dye, and an anthraquinone dye, and among these, an azo dye is preferred. Examples of the azo dye include a mono-azo dye, a bis-azo dye, a tris-azo dye, a tetrakis-azo dye, and a stilbene azo dye, and a bis-azo dye and a tris-azo dye are preferred. Though the dichroic dye may be used alone or two or more types of dichroic dyes may be combined, three or more types of dichroic dyes are preferably combined. In particular, three or more types of azo compounds are more preferably combined. A part of the dichroic dye may include a reactive group or may have liquid crystallinity.

The linear polarization layer made from the liquid crystal layer can be formed, for example, by applying a polarization layer forming composition containing a polymerizable liquid crystal compound and a dichroic dye onto an alignment layer formed on a substrate and polymerizing and curing the polymerizable liquid crystal compound. Alternatively, the linear polarization layer may be formed by applying a polarization layer forming composition to a substrate to form a coating and stretching the coating together with a substrate layer. A substrate used for forming the linear polarization layer may be used as a protective layer for the linear polarization layer. Examples of the substrate include a resin film such as a formed film composed of a material that makes up the above-described protective layer.

Japanese Patent Laying-Open No. 2013-37353, Japanese Patent Laying-Open No. 2013-33249, and Japanese Patent Laying-Open No. 2017-83843 each describe an exemplary polarization layer forming composition containing a polymerizable liquid crystal compound and a dichroic dye and an exemplary method of manufacturing a linear polarization layer with the composition. The polarization layer forming composition may further contain, in addition to the polymerizable liquid crystal compound and the dichroic dye, a solvent and an additive such as a polymerization initiator, a cross-linking agent, a leveling agent, an antioxidant, a plasticizer, or a sensitizer. Only one type of these components may be used alone or two or more types of them may be used as being combined.

A polymerization initiator that may be contained in the polarization layer forming composition refers to a compound that can start polymerization reaction of a polymerizable liquid crystal compound, and a photopolymerization initiator is preferred because of its ability to start polymerization reaction under a condition at a lower temperature. Specific examples of the initiator include a photopolymerization initiator capable of generating active radicals or acid owing to an effect of light, and among others, a photopolymerization initiator that generates radicals owing to an effect of light is preferred. A content of the polymerization initiator is preferably from 1 part by mass to 10 parts by mass and more preferably from 3 parts by mass to 8 parts by mass with respect to a total amount of 100 parts by weight of the polymerizable liquid crystal compound. Within this range, reaction of a polymerizable group sufficiently proceeds and a state of alignment of the liquid crystal compound is more readily stabilized.

Though a thickness of the linear polarization layer made from the liquid crystal layer is not particularly limited, the thickness is preferably not larger than 20 μm, more preferably not larger than 10 μm, and further preferably not larger than 5 μm.

The linear polarization layer made from the liquid crystal layer may include an overcoat layer on one surface or opposing surfaces thereof. The overcoat layer can be provided for protection of the linear polarization layer. The overcoat layer can be formed, for example, by applying a material (composition) for forming the overcoat layer onto the linear polarization layer. Examples of a material for forming the overcoat layer include a photocurable resin or a water-soluble polymer, and a (meth)acrylic resin or a polyvinyl alcohol based resin can be employed.

(Retardation Layer)

One retardation layer or two or more retardation layers may be provided and the retardation layer includes at least a λ/4 layer. The λ/4 layer may be reverse-wavelength dispersive. The retardation layer may include an overcoat layer that protects a surface of the retardation layer or a substrate film that supports the retardation layer. The retardation layer includes a λ/4 layer and may further include a λ/2 layer or a positive C layer. When the retardation layer includes a λ/2 layer, the λ/2 layer and the λ/4 layer are layered sequentially from a side of the linear polarization layer. When the retardation layer includes the positive C layer, the λ/4 layer and the positive C layer may be layered sequentially from the side of the linear polarization layer or the positive C layer and the λ/4 layer may be layered sequentially from the side of the linear polarization plate.

The retardation layer may be formed of a resin material exemplified as the material for the protective layer or formed from a layer obtained by curing a polymerizable liquid crystal compound. The retardation layer may further include an alignment film or a substrate film, and may include a bonding layer for bonding between the λ/4 layer and the λ/2 layer. The bonding layer is made from a pressure-sensitive adhesive layer or an adhesive layer and can be formed of the pressure-sensitive adhesive composition or the adhesive composition described above.

A thickness of the entire retardation layer is not particularly limited. When circular polarization plate 43 has bendability, the thickness can be, for example, not smaller than 1 μm and not larger than 50 μm.

(Second Bonding Layer and Third Bonding Layer)

As described in connection with optical laminates 50 and 51 shown in FIGS. 6 and 7, second bonding layer 42 and third bonding layer 44 can be used as a layer that bonds front plate 41 to circular polarization plate 43, front plate 41 to the TS panel, and/or circular polarization plate 43 to the TS panel. Second bonding layer 42 and third bonding layer 44 are independently made from an adhesive layer formed of an adhesive composition or from a pressure-sensitive adhesive layer formed of a pressure-sensitive adhesive composition. Second bonding layer 42 and third bonding layer 44 are both made preferably from a pressure-sensitive adhesive layer.

An adhesive composition to be used for forming the adhesive layer and a pressure-sensitive adhesive composition to be used for forming the pressure-sensitive adhesive layer can be formed of the adhesive composition and the pressure-sensitive adhesive composition described above.

A thickness of second bonding layer 42 and third bonding layer 44 is not particularly limited. When second bonding layer 42 or third bonding layer 44 is made from an adhesive layer, the thickness is independently preferably not smaller than 0.1 μm and may be not smaller than 0.5 μm, and is preferably not larger than 10 µm and may be not larger than 5 µm. When second bonding layer 42 or third bonding layer 44 is made from a pressure-sensitive adhesive layer, a thickness of second bonding layer 42 and third bonding layer 44 is independently preferably not smaller than 10 µm and may be not smaller than 15 µm, not smaller than 20 µm, or not smaller than 25 µm, and is normally not larger than 200 µm and may be not larger than 100 µm or not larger than 50 µm.

EXAMPLES

Though the present invention will be described below further specifically with reference to Examples and Comparative Examples, the present invention is not limited by these Examples. An amount of formulation expressed by "part" in Examples and Comparative Examples refers to a part by mass unless otherwise specified.

[Measurement of Water Vapor Transmission Rate]

(1) Measurement of Water Vapor Transmission Rate Pc of Base Layer

Water vapor transmission rate Pc of the base layer used in Examples and Comparative Examples was measured in a procedure below. Initially, in a procedure described in Example 1, the base layer was made by forming a separation layer and a protective layer on a glass substrate, thereafter peeling off the glass substrate, and bonding a surface exposed by peel-off and a substrate layer used in each of Examples and Comparative Examples to each other by using an ultraviolet curable adhesive composition used in each of Examples and Comparative Examples to form the first bonding layer. A water vapor transmission rate of the made base layer was measured at a measurement temperature of 40° C. and a measurement humidity of 90% RH for a measurement time period of 24 hours with the testing methods for determination of the water vapor transmission rate in accordance with JIS Z 0208 (dish method).

(2) Measurement of Water Vapor Transmission Rate Pa of First Insulating Layer

Water vapor transmission rate Pa of the first insulating layer used in Examples and Comparative Examples was measured in a procedure below. A film for measurement was obtained by coating a triacetyl cellulose (TAC) film having a thickness of 25 µm with a composition for forming the first insulating layer and forming the coating like a film such that a thickness after drying attained to thickness Da shown in Table 1. The water vapor transmission rate of the obtained film for measurement was measured in accordance with the procedure in the testing methods for determination of the water vapor transmission rate described in (1) Measurement of Water Vapor Transmission Rate Pc of Base Layer. Since the water vapor transmission rate of the TAC film is sufficiently higher than the water vapor transmission rate of the first insulating layer, the water vapor transmission rate measured by using a measurement sample can be regarded as the water vapor transmission rate of the first insulating layer. Table 1 shows results.

[Measurement of Thickness]

In measurement of thickness D of the base layer and thickness Da of the first insulating layer, a cross-section of a cut laminate was observed with a transmission electron microscope (SU8010 manufactured by HORIBA, Ltd.) and a thickness of each layer was measured based on an obtained observation image. In Examples and Comparative Examples, a thickness of a portion shown with Da in FIG. 2 was defined as thickness Da of the first insulating layer (a maximum thickness of the first insulating layer). Table 1 shows a value of a measured thickness.

[Measurement of Toughness]

For measuring toughness Tc of the base layer, the base layer was made in the procedure described in (1) Measurement of Water Vapor Transmission Rate Pc of Base Layer in [Measurement of Water Vapor Transmission Rate]. Toughness Tc of the made base layer was measured as below in conformity with JIS K 1761. A small rectangular piece having a dimension of a long side of 110 mm×a short side of 10 mm was cut from the base layer by using a super cutter. Then, opposing ends in a direction of the long side of the small piece were gripped by upper and lower grips of a tensile tester [Autograph AG-Xplus tester manufactured by Shimadzu Corporation] such that a distance between the grips was set to 5 cm and the small piece was pulled in the direction of the long side in an environment at a temperature of 23° C. and a relative humidity of 55% at a tensile speed of 4 mm/minute. Toughness was calculated as an integral of a stress-strain curve during a period between the initial stage and break. Table 1 shows results.

[Drive Test]

The optical laminate obtained in Examples and Comparative Examples was stored for 24 hours in a high-temperature and high-humidity environment at a temperature of 85° C. and a humidity of 85% RH. Thereafter, the optical laminate was placed for 30 minutes in a room-temperature environment at a temperature of 25° C. and a humidity of 45% RH and then a drive test of the TS panel was conducted. In the drive test, the TS panel and a touch sensor tester were connected to each other, and the touch sensor tester tested a touch sensor function. A capacitance was measured at each node in the TS layer, and capacitances were averaged to obtain an average value. When detection values at the nodes were all within a range of ±15% from the average of values within which determination as being normal in touch sensor function was made, evaluation as A was made. Even one of detection values at the nodes exceeding +15% of the average value was regarded as short-circuiting and even one of detection values at the nodes being lower than −15% of the average value was regarded as open, in which case determination as B was made.

[Visibility Test]

A laminate for visibility test obtained by bonding a first insulating layer side of the TS panel obtained in each of Examples and Comparative Examples to a positive C layer side of the circular polarization plate with a pressure-sensitive adhesive layer (8146-1 manufactured by 3M Company and having a thickness of 25 µm) being interposed was stored for 24 hours in an environment at a temperature of 60° C. and a humidity of 90% RH. Thereafter, the laminate for visibility test was placed for 2 hours in a room-temperature environment at a temperature of 25° C. and a humidity of 45% RH and then the visibility test was conducted. In the visibility test, in a darkroom, the laminate for visibility test was placed on an LED backlight (DSN-1200 manufactured by UP, an illumination of 3000 Lux) such that the TS panel was arranged on an LED backlight side and observed with naked eyes from a circular polarization plate side. Evaluation as A was made when the patterned conductive layer was not visually recognized and evaluation as B was made when the patterned conductive layer was visually recognized. Table 1 shows results.

[Bendability Test]

A laminate for bendability test was obtained by bonding a panel-simulating laminate that simulated an organic EL panel to the TS panel side of the optical laminate obtained in each of Examples and Comparative Examples with a pressure-sensitive adhesive layer (8146-1 manufactured by 3M Company and having a thickness of 25 μm) being interposed. The panel-simulating laminate was obtained by layering a polyimide based resin film PI1 having a thickness of 38 μm and a polyimide based resin film PI2 having a thickness of 50 μm with a pressure-sensitive adhesive layer (8146-1 manufactured by 3M Company and having a thickness of 25 μm) being interposed, and the TS panel of the optical laminate was bonded to a polyimide based resin film PI1 side.

The laminate for bendability test obtained above was subjected to the bendability test at a temperature of 25° C. in a procedure shown below. The laminate for bendability test obtained in each of Examples and Comparative Examples was set in a flat (not bent) state in a bending tester (DLDMLH manufactured by Yuasa Folding), and the laminate for bendability test was subjected to a bending operation to bend the laminate and thereafter return the laminate to the original flat state such that a radius of bending at the time of bending with a side of the front plate being located on an inner side was set to 2.5 mm. The bending operation performed once was counted as one bending, and this bending operation was repeated. The number of times of bending at the time when a crack was generated or the pressure-sensitive adhesive layer floated in a region bent in the bending operation was determined as the limit number of times of bending. An example in which no crack or floating of the pressure-sensitive adhesive layer was observed in the region bent in the bending operation even after two hundred thousand times of bending was evaluated as A, an example in which the crack or floating of the pressure-sensitive adhesive layer was observed when the number of times of bending was not smaller than one hundred thousand times and smaller than two hundred thousand times was evaluated as B, and an example in which the crack or floating of the pressure-sensitive adhesive layer was observed when the number of times of bending was not smaller than fifty thousand times and smaller than one hundred thousand times was evaluated as C.

Example 1

(1) Making of TS Panel

The TS panel having the structure shown in FIG. 5 was prepared in a procedure below. A separation layer and a protective layer were formed in this order as a support layer on a glass substrate as a carrier substrate, and unit patterns 27a and 27b (first conductive layer) in a pattern as shown in FIG. 3 were formed on the protective layer. The separation layer was formed of an acrylic resin composition by slot die coating and had a thickness of 0.5 μm. The protective layer was formed of an acrylic resin composition by slot die coating and had a thickness of 3 μm. The first conductive layer was formed in a pattern by forming a film of indium tin oxide (ITO) on the entire surface by sputtering and thereafter etching the film by photolithography. The first conductive layer had a thickness of 0.1 μm. As shown in FIG. 3, a unit cell of the first conductive layer had a length Lw of 4.2 mm in a lateral direction in FIG. 3 and a length L1 of 4.3 mm in a vertical direction. A distanced (FIG. 3) between unit patterns 27a and 27b was set to 10 μm. A film was formed on the entire surface of a region to be an interconnection region on the first conductive layer by sputtering by using an Ag-palladium-copper alloy (APC) and thereafter etched into a pattern by photolithography. A connection interconnection having a thickness of 0.2 μm was further formed.

Then, the second insulating layer was formed to cover a surface of the first conductive layer and the connection interconnection and to fill a space between conductive layers formed in a pattern at a distance in the plane direction. The second insulating layer was formed of a photosensitive resin composition described in Example 3 of Japanese Patent Laying-Open No. 2016-14877, by applying, curing, and patterning the composition. The second insulating layer was formed such that a surface thereof opposite to the support layer was flat without conforming to a height difference attributed to the first conductive layer and a thickness of the second insulating layer from a position of the surface of the support layer on the side of the first conductive layer (a position of the surface of the refraction index adjustment layer on the side of the first conductive layer) was 2 μm.

In succession, after an opening was provided in the second insulating layer by photolithography, a via was provided in this opening and coupling portion 28c (second conductive layer) in a pattern as shown in FIG. 3 was formed on the second insulating layer. Coupling portion 28c was formed to electrically be connected to unit pattern 27b (first conductive layer) through the via provided in the opening in the second insulating layer. The via and coupling portion 28c were formed in a pattern by forming a film of indium tin oxide (ITO) on the entire surface by sputtering and thereafter etching the film by photolithography. A thickness of coupling portion 28c on the second insulating layer was 0.12 μm. Coupling portion 28c had a length Lcw of 50 μm in the lateral direction in FIG. 3 and a length Lcl of 380 μm in the vertical direction, as shown in FIG. 3.

Then, the first insulating layer was formed to cover the surface of coupling portion 28c (second conductive layer) and to fill a space between the conductive layers formed in the pattern at a distance in the plane direction. The first insulating layer was formed of a photosensitive resin composition described in Example 3 of Japanese Patent Laying-Open No. 2016-14877 and applying and curing the composition. The first insulating layer was formed such that a surface thereof opposite to the support layer was flat without conforming to a height difference attributed to coupling portion 28c (second conductive layer) and thickness Da was 2 μm.

The TS panel having the structure shown in FIG. 5 was obtained by peeling off the glass substrate from the obtained laminate and bonding the surface from which the glass substrate had been peeled off to a cyclic olefin (COP) based film (having a thickness of 23 μm) as a substrate layer (ZF-14 manufactured by Zeon Corporation) with the use of an ultraviolet curable adhesive composition, to thereby form the first bonding layer. The obtained TS panel had a size of 165 mm long×105 mm wide.

(2) Making of Optical Laminate (Preparation of Front Plate)

A resin film with hard coat layer having a thickness of 50 μm in which a hard coat layer had been formed on each of opposing surfaces of a resin film was prepared as the front plate. The resin film was a polyamide-imide (PAI) based resin film having a thickness of 30 μm, and the hard coat layer had a thickness of 10 μm and was formed of a composition containing a dendrimer compound having a polyfunctional acrylic group at a terminal.

(Preparation of Circular Polarization Plate)

On a triacetyl cellulose (TAC) film (KC2UA manufactured by Konica Minolta, Inc. and having a thickness of 25

μm), an optical alignment film was formed. Thereafter, by applying a composition containing a dichroic dye and a polymerizable liquid crystal compound to the optical alignment film and aligning and curing the composition, a linear polarization layer having a thickness of 2.5 μm was obtained. An overcoat layer was formed on the linear polarization layer by applying by bar coating, an overcoat layer forming composition (a mixture of 100 parts of water, 3 parts of polyvinyl alcohol resin powders (KL318 manufactured by Kuraray Co., Ltd. and having an average polymerization degree of 18000), and 1.5 part of a polyamide epoxy resin (SR650 (30) manufactured by Sumika Chemtex Co., Ltd.) as a cross-linking agent) such that a thickness thereof after drying was 1.0 μm. A linear polarization plate having a layered structure of the TAC film/the optical alignment film/the linear polarization layer/the overcoat layer was thus obtained.

By bonding a λ/4 layer side which will be described later of a retardation layer to the overcoat layer of the obtained linear polarization plate, the circular polarization plate was obtained. An angle formed between an absorption axis of the linear polarization plate and a slow axis of the retardation layer was set to 45°. The retardation layer had a thickness of 14 μm and had such a layered construction as the pressure-sensitive adhesive layer, the λ/4 layer, the pressure-sensitive adhesive layer, and the positive C layer layered in this order. Each pressure-sensitive adhesive layer had a thickness of 5 μm. The λ/4 layer included a layer obtained by curing of a liquid crystal compound and an alignment film, and had a thickness of 3 μm. The positive C layer included a layer obtained by curing of a liquid crystal compound and an alignment film, and had a thickness of 1 μm.

(Making of Optical Laminate)

A TAC film side of the circular polarization plate was bonded to one surface of the front plate prepared above with a pressure-sensitive adhesive layer as the second bonding layer (8146-1 manufactured by 3M Company and having a thickness of 25 μm) being interposed. The optical laminate having the layered structure shown in FIG. 6 was obtained by bonding the first insulating layer of the TS panel made above to the positive C layer side of the circular polarization plate of the obtained laminate with a pressure-sensitive adhesive layer as a third bonding layer (8146-1 manufactured by 3M Company and having a thickness of 25 μm) being interposed. The bonding surface of each of the front plate, the second bonding layer, the circular polarization plate, the third bonding layer, and the TS panel was subjected to corona treatment before bonding. The obtained optical laminate had a size of 165 mm long×105 mm wide. The obtained optical laminate was subjected to the drive test and the bendability test. Table 1 shows results.

Examples 2 and 3 and Comparative Examples 1 to 3

The TS panel was made as in Example 1 except for use of a component shown in Table 1 as the substrate layer and setting of the thickness of the first insulating layer to a thickness shown in Table 1. The optical laminate was made from the made TS panel in a procedure as in Example 1. The obtained optical laminate was subjected to the drive test and the bendability test. Table 1 shows results.

TABLE 1

|  | Example | | | Comparative Example | | |
| --- | --- | --- | --- | --- | --- | --- |
|  | 1 | 2 | 3 | 1 | 2 | 3 |
| First insulating Layer | | | | | | |
| Water Vapor Transmission Rate Pa [g/m² · 24 hr] | 700 | 500 | 270 | 1000 | 1000 | 1000 |
| Thickness Da [μm] | 2 | 3 | 6 | 1 | 1 | 1 |
| Base Layer | | | | | | |
| Type of Substrate Layer | COP | Acryl | COP | COP | TAC | COP |
| Water Vapor Transmission Rate Pc [g/m² · 24 hr] | 18 | 70 | 18 | 18 | 1000 | 14 |
| Thickness Dc [μm] | 23 | 40 | 23 | 23 | 20 | 40 |
| Toughness Tc [mJ/mm³] | 1.0 | 7.0 | 1.0 | 1.0 | 17.7 | 1.4 |
| Tc/(Dc + Da) | 0.04 | 0.16 | 0.03 | 0.04 | 0.84 | 0.03 |
| Drive Test | A | A | A | B | B | B |
| Visibility Test | A | A | A | B | B | B |
| Bendability Test | A | A | B | A | A | C |

In Table 1, COP represents a cyclic polyolefin (COP) based resin film (a COP based resin film (ZF-14 manufactured by Zeon Corporation and having a thickness of 23 μm) or a COP based resin film (ZF-16 manufactured by Zeon Corporation and having a thickness of 40 μm)), Acryl represents an acrylic resin film (OXIS manufactured by Okura Industrial Co., Ltd.), and TAC represents a triacetyl cellulose based resin film (KC2CT1W manufactured by Konica Minolta, Inc.).

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A touch sensor panel comprising in this order:
   a base layer,
   a touch sensor layer, and
   a first insulating layer,
   wherein the first insulating layer contains no inorganic particles or contains inorganic particles in an amount of less than 10% by weight of a total weight of the first insulating layer,
   the touch sensor layer including a patterned conductive layer, a water vapor transmission rate Pc of the base layer at a temperature of 40° C. and a humidity of 90% RH being not higher than 900 g/(m²•24 hr), a water vapor transmission rate Pa of the first insulating layer at a temperature of 40° C. and a humidity of 90% RH being not higher than 900 g/(m²•24 hr), and wherein relation in an expression (1)below is satified:

$$Tc/(Dc+Da)>0.03 \quad (1)$$

where Dc [μm] represents a thickness of the base layer, Tc [mJ/mm³] represents toughness of the base layer, and Da [μm] represents a thickness of the first insulating layer.

2. The touch sensor panel according to claim 1, wherein the patterned conductive layer includes a first conductive layer and a second conductive layer sequentially from a side of the base layer, and the touch sensor layer further includes a second insulating layer between the first conductive layer and the second conductive layer.

3. The touch sensor panel according to claim 1, wherein the base layer includes a support layer, a first bonding layer, and a substrate layer sequentially from a side of the touch sensor layer.

4. The touch sensor panel according to claim 3, wherein the support layer includes a separation layer.

5. The touch sensor panel according to claim 4, wherein the support layer further includes a protective layer on a touch sensor layer side of the separation layer.

6. The touch sensor panel according to claim 4, wherein the support layer further includes a refraction index adjustment layer.

7. An optical laminate comprising:

a front plate;

a circular polarization plate; and the touch sensor panel according to claim 1.

8. The optical laminate according to claim 7, comprising in this order:

the front plate;

a second bonding layer;

the circular polarization plate;

a third bonding layer, and the touch sensor panel.

\* \* \* \* \*